June 24, 1947.  H. PFLEUMER  2,422,797
LEAKPROOF FUEL TANK
Filed March 8, 1941
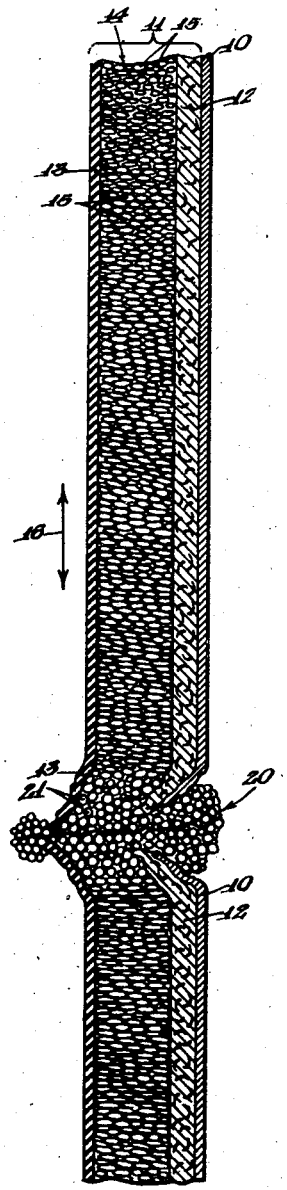
INVENTOR
Hans Pfleumer
BY
Samuel Ortu
ATTORNEY Patented June 24, 1947

2,422,797

UNITED STATES PATENT OFFICE 2,422,797

LEAKPROOF FUEL TANK

Hans Pfleumer, New Brunswick, N. J., assignor to Rubatex Products, Inc., New York, N. Y., a corporation of Delaware Application March 8, 1941, Serial No. 382,378

4 Claims. (Cl. 154—139)

This invention relates to leak-proof fuel tanks and, more particularly, to the lining therefor which provides integrally asssociated therewith means for resealing the tank immediately after the same has been punctured as, for instance, by bullets. Such linings for leak-proof fuel tanks are, of course, intended to be used in automobiles, trucks, tanks, airplanes or other vehicles which are, by reason of the manner in which the same are used, exposed to danger of a military character.

Heretofore, the walls of tanks which were to be used for this purpose have been formed of an inner lining of a synthetic rubber having a high resistance to the dissolving action of petrols, an outer protective jacket of cowhide or other leather and a filler between the two acting as an automatic seal after the puncture. Such a lining was placed in the interior of the metal or armored fuel tank and laminated thereto in any suitable manner. The filler has been composed of a combination of several layers of raw rubber, sponge rubber or soft cell tight rubber which has been plied or laminated with the other layers above mentioned. These inner plies are intended to swell up by reason of the action of the leaking gasoline and thus stop up the hole.

It is reasonable to believe that this process consumes some time and possibly this type of plugging action may not be sufficient to hold back a large head of fuel.

An object of the present invention is the provision of an inner layer or ply for the lining of a fuel tank which will swell and plug up an opening immediately after the same has been made.

For this purpose I have developed a cellular rubber sheet consisting of a soft rubber having a plurality of minute cells therein, the cells being isolated from each other and not communicating, with gas pressure in each individual cell, the gas pressure in each cell being substantially higher than atmospheric pressure.

In general, should a hole be punctured in a cellular rubber of the type above described where the cells contain practically normal pressure, the cells surrounding the hole cannot quickly close the hole up except by the sealing action of the escaping fluid.

However, if the cells of the soft cellular rubber laminaton are made to contain gas pressure which is 50 to 100% greater than that of the surrounding air (from 1½ to 2 atmospheres absolute), the cells surrounding the puncture will immediately close up the hole behind the bullet by reason of the cumulative gas pressure in each cell. The gas pressure in such cells after the expansion has occurred probably will not be quite as high as the gas pressure in the cells which have not been disturbed but in any event should be higher than atmospheric and certainly should be greater than that in cells of a sheet which has been fully expanded before being laminated.

The most important object of the present invention therefore is the provision of a cellular soft rubber strip having a multiplicity of minute cells which do not communicate with each other, where the individual cells have an internal gas pressure substantially higher than that of the atmosphere.

A further object of this invention is the provision in a leak-proof lining for the fuel tank of a cell tight rubber strip, the cells of which have an internal pressure substantially higher than that of the surrounding atmosphere.

Further objects and uses of the present invention will in part be apparent and in part pointed out in the following description and drawing in which there is shown a cross-sectional view of a fuel tank lining embodying the principles of my invention.

Referring now to the figure, I have here shown a cross-section of a fuel tank lining comprising the outer metallic or armored container 10 and a lining 11 secured and laminated thereto in any suitable manner. The lining 11 preferably comprises three general areas which include a strong flexible strip 12 preferably of cowhide or other similar strong flexible material; an inner layer 13 of a synthetic rubber having a high resistance to the dissolving action of petrols and a central expanding layer 14, the operation of which is hereinafter described.

The lining 11 and the outer container or armor 10 may be provided as a single unit; or the lining 11 may be inserted in any existing fuel tank, the heavy flexible strip 12 providing a suitable base for securing the expanding lining therein.

The central layer 14 is the essential element of the present invention and preferably comprises a sheet of soft cellular rubber having a plurality of minute cells 15, each of the cells having a high internal gas pressure. In the structure shown in the figure, the central layer 14 has been permitted to expand somewhat laterally, that is on a line normal to the walls of the container, so that the cells 15 are substantially oblong along that line while compression is maintained along planes or lines parallel to the layer. Owing to the fact, however, that the pressure on the inner surface of each of the cells is substantially equal, these cells have a tendency to assume a spherical form and thus cause the sheet to expand in a direction indicated by the arrow 16 should any restraining pressure on the sheet itself be released.

The lining 11, however, is so arranged that the central layer 14 cannot expand laterally in a direction parallel to the walls and hence there is a high internal pressure tending to close up any opening which may be made through the wall.

When the bullet or other projectile penetrates the lining leaving a hole in the tank and lining as at 20, then the gap which has thereby been created removes any restraint which may have existed against longitudinal expansion (parallel to the walls of the container) which may have previously existed. The cells 15 are permitted then to assume a spherical form as at 21 and thus to expand the material in a direction parallel to the walls and thus immediately to close up the hole which is thereby formed. This expansion is an immediate mechanical expansion owing to the constant pressure maintained within the cells of the central strip and is not a delayed one which depends on the chemical action of the fuel to cause a swelling.

The release of pressure at the hole 20 causes the central material 14 to expand as at 21 to close up the hole and even causes portions of the material to expand outside of the hole and plug the same completely. The high pressure maintained within the cells is sufficient to hold back a substantial head of fuel, thus immediately preventing any loss whatever.

Furthermore since there is no delay in the plugging action any loss from that cause can also be prevented and, in addition, since it is not necessary for any fuel to leak through the hole in order to cause the same to swell and since, therefore, the hole is plugged immediately, any danger which may arise from the spraying of gasoline near hot exhausts is avoided.

The cellular strip 14 which constitutes the essential element of my invention may be made in a very simple manner. The process of forming soft cellular rubber strips having cells which do not communicate with each other and having gas present within each of the cells has been fully described in Patents Nos. 1,905,269, Re. 21,245, 2,110,400 2,122,438, and applications Ser. Nos. 159,706 and 164,868.

In the process of making soft cellular cell-tight rubber, as set forth in the foregoing patents and applications, a rubber mix is placed in a mold and then gassed under pressure and heat so that it is partially vulcanized and expanded to fill the mold. After the first partial vulcanization and preliminary expansion the gassed rubber is removed from the mold and, by reason of the fact that restraint is now withdrawn, immediately expands to several times its original volume.

Since the rubber has been confined within the mold during the gassing and partial vulcanization, the cells are not ruptured and the later expansion of the rubber occurs owing to the resilience of the partially vulcanized rubber and does not cause any rupture of the cells. Each of the cells, therefore, is a closed cell which does not communicate with any of the other cells.

The rubber, in its partially vulcanized, expanded form, is then given a final vulcanization by heating it in an oven at about 150° Fahrenheit. This sets the rubber in its final expanded closed cell form.

When the closed cell rubber is expanded in this form, the pressure within the cells is practically of atmospheric density or only slightly more.

A sheet, which has been made in this form, expands in all dimensions—length, breadth, and thickness.

For the purposes of the present invention it is necessary that the sheet be permitted to expand fully only in thickness, and that its expansion in length and breadth be inhibited, either mechanically or in any other suitable manner, so that the oblong cells above described may be formed.

I, therefore, place the rubber mix in a mold and, following the first steps in the process above described, I gas and partially vulcanize the rubber mix under pressure without permitting it to expand. After the gassing and partial vulcanization operation is completed, the rubber mix in its mold may be removed from the heating chamber and placed in a freezing chamber for six hours or more. The rubber mix is left in the mold in order to prevent the expansion above described.

After the rubber mix has been chilled, for the above mentioned period, the gassed sheet when removed from the mold will not expand as it might otherwise have done and may in this state be used as a filler within the walls and linings above-mentioned. Preferably, the sheet, in its partially vulcanized, unexpanded form, is then cemented with the walls and linings above-mentioned and laminated into the completed structure before it has any opportunity to expand.

The completely assembled wall with one or several layers of this filling material now may be utilized as a mold which itself will prevent expansion in undesired directions. The completed wall in which the partially vulcanized unexpanded filling material has been incorporated, as above pointed out, is then placed in an oven and exposed to heat of the order of 150° Fahrenheit. Since the sheet now is prevented, by reason of its being arranged in a laminar form, (shown in the figure) from expanding normally in three dimensions, but can only expand in thickness, it follows that the cells, after this final expansion, are not normally shaped, but rather are oblong in the direction of the thickness as shown in the drawings.

This process may be carried out in several ways: The mold within which the original partial vulcanization and in which later the chilling is to occur need not necessarily be a fixed mold. For instance, a solid sheet of appropriate rubber mix may be wrapped over a pipe and between strong strips of canvas and then gassed under pressure and partially vulcanized in the manner above-described without permitting expansion of the sheet. The sheet, while wrapped, is then removed from the hot chamber. The cells may expand to some extent, but substantial expansion is prevented by the strong wraps of canvas. The sheet wrapped in canvas is then placed in the freezing chamber for the six-hour period above-mentioned. The sheet may then be unwrapped after chilling and will not expand substantially as it might otherwise have done.

The laminating process should, however, follow immediately in order to ensure that any further expansion will be only in the thickness and to make sure that the sheet will be inhibited from expanding in length or breadth.

The confinement of the sheet within the laminar wall so that it may expand only in thickness, therefore, prevents a full expansion of the cells so that the internal pressure may reach atmospheric pressure and the internal elevated pressure of the cells is maintained.

Nevertheless, the cells in this distorted form have a tendency to become normal (spherical); and should they be given an opportunity to do so by removal of a part of the sheet, they will immediately close up the breech.

This property of stiffening during refrigeration can be greatly increased by admixing balata. It has been observed that such compounds can be made to hold a much higher pressure than ordinary rubber. Hydrocarbons of this type after vulcanization partake of the resiliency of rubber within specific temperature limits. However, when chilled, even though vulcanized it may be changed into a non-yielding material until it is again warmed up, thus serving to preserve the form of the cells when the material is chilled and therefore preventing undesired expansion until the material has been laminated with other retaining materials.

By this means a soft cell tight rubber strip having substantially high gas pressure within each of the minute cells may be utilized to plug up a breach in a fuel tank without relying on any chemical reaction caused by the flow of petrol and therefore without any undue delay.

Any particles of the cellular rubber layer which may be separated from the filler, as when a bullet penetrates or any other particles of the liner may be prevented from finding their way into the fuel lines by a suitable screen placed over the tank outlet.

While the fuel lines thus may, in ordinary cases, be equipped with traps, the provision of screens over the tank outlets peculiarly adapted to intercept the particles of the lining will prevent any possible stoppage of the motor which may be caused by a restriction of the fuel supply.

The many variations in the construction of the lining sheet will now be obvious to those skilled in the art, the essential element being the confining of the expansible sheet by the other laminations used in the lining so that the sheet may expand only when a breach occurs and so that the expansion thereby occasioned will fill the breach.

Many other uses of the foregoing invention should now be clear to those skilled in the art and I prefer, therefore, to be bound not by the specific disclosures herein but only by the appended claims.

I claim:

1. A method for manufacturing gas-expanded cell-tight rubber, said method comprising the gassing of said rubber under pressure while the same is confined within a mold and partially vulcanizing the said rubber; the removal of the rubber from the gassing means while the rubber is confined in the mold and placing the rubber in a freezing chamber while it is confined within the mold; the removal of the rubber from the freezing chamber and the subsequent removal of the rubber from the mold; confining the rubber between a plurality of sheets and completing the vulcanization thereof.

2. A method for manufacturing gas-expanded cell-tight rubber, said method comprising the gassing of said rubber under pressure while the same is confined within a mold and partially vulcanizing the said rubber; the removal of the rubber from the gassing means while the rubber is confined in the mold and placing the rubber in a freezing chamber while it is confined within the mold; the removal of the rubber from the freezing chamber and the subsequent removal of the rubber from the mold; cementing the rubber between a plurality of sheets whereby the expansion of the rubber in length and breadth is inhibited and completing the vulcanization of the rubber and thereby expanding the rubber in thickness only.

3. A method for manufacturing gas-expanded cell-tight rubber, said method comprising the gassing of said rubber under pressure while the same is confined within a mold and partially vulcanizing the said rubber; the removal of the rubber from the gassing means while the rubber is confined in the mold and placing the rubber in a freezing chamber while it is confined within the mold; the removal of the rubber from the freezing chamber and the subsequent removal of the rubber from the mold; cementing the rubber between a plurality of sheets whereby the expansion of the rubber in length and breadth is inhibited and completing the vulcanization of the rubber and thereby expanding the rubber in thickness whereby the cells of the cell-tight rubber assume an oblong shape in the direction of the thickness thereof; the pressure within the cells being thereby substantially elevated above atmospheric pressure.

4. The method of manufacturing cell-tight rubber comprising the admixture of a balata with the rubber; the gassing of the rubber under pressure while the same is confined within a mold and partially vulcanizing the said rubber; the removal of the rubber from the gassing means while the rubber is confined in the mold and placing the rubber in a freezing chamber while it is confined within the mold; the removal of the rubber from the freezing chamber and the subsequent removal of the rubber from the mold; confining the rubber between a plurality of sheets and completing the vulcanization thereof.

HANS PFLEUMER.

REFERENCES CITED

The following references are of record in the file of this patent:

UNITED STATES PATENTS

| Number | Name | Date |
| --- | --- | --- |
| 1,406,667 | Macbeth | Feb. 14, 1922 |
| 1,453,305 | Cleghorn | May 1, 1923 |
| 1,645,604 | Lower | Oct. 18, 1927 |
| Re. 21,245 | Denton | Oct. 24, 1939 |
| 2,110,400 | Peel | Mar. 8, 1938 |
| 2,122,438 | Roberts | July 5, 1938 |
| 1,905,269 | Denton | Apr. 25, 1933 |
| 1,948,046 | Ralpsaet | Feb. 20, 1934 |